United States Patent [19]

McConnell et al.

[11] Patent Number: 5,297,579
[45] Date of Patent: Mar. 29, 1994

[54] BALL AND SEAT-TYPE CHECK VALVE FOR DOWNHOLE ROD PUMP

[76] Inventors: Kenneth R. McConnell, 8532 - 67 Avenue, Edmonton, Alberta, Canada, T6E OM8; Douglas A. Jensen, 9017 - 60 Street, Edmonton, Alberta, Canada, T6C 3L8

[21] Appl. No.: 868,361

[22] Filed: Apr. 14, 1992

Related U.S. Application Data

[63] Continuation-in-part of Ser. No. 529,497, May 29, 1990, Pat. No. 5,117,861.

[51] Int. Cl.$^5$ .............................................. F16K 15/06
[52] U.S. Cl. .............................. 137/515.7; 137/533.25; 137/533.29; 137/543
[58] Field of Search ............. 137/515.5, 515.7, 533.25, 137/533.29, 543

[56] References Cited

U.S. PATENT DOCUMENTS

| | | | |
|---|---|---|---|
| 170,974 | 12/1875 | Westwater | 137/533.25 X |
| 1,960,970 | 5/1934 | Fina | 137/533.25 X |
| 2,301,276 | 11/1942 | Gussick | 137/533.25 X |
| 2,943,639 | 7/1960 | Smith | 137/533.25 X |

Primary Examiner—Robert G. Nilson
Attorney, Agent, or Firm—Millen, White, Zelano, & Branigan

[57] ABSTRACT

The plunger of the valve has a semi-spherical valve member of reduced diameter, so that it is inwardly spaced from the ribs of the cage. The plunger is centralized and guided by top and bottom stems attached to the ball and working loosely in apertured webs carried by the cage and seat member. The cage has 2 or 3 ribs only, so that the windows are wider. The cage web is downwardly spaced from the top of the cage, to maximize the area of the cage outlet. The valve member has a reduced diameter neck at its upper end, to keep the valve member downwardly spaced from the cage web when the valve is fully open. As a result of these features the cross-sectional areas of the flow passage through the opened valve are increased. The stems are preferably straight-sided and the web openings are circular so fluid may flush out solids packing between the stems and webs. The valve has been improved to increase flow capacity and ensure line contact seating which can be maintained even though there is wear of the parts.

26 Claims, 7 Drawing Sheets

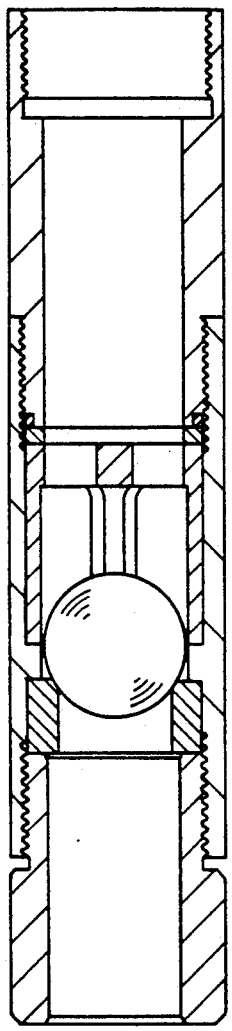
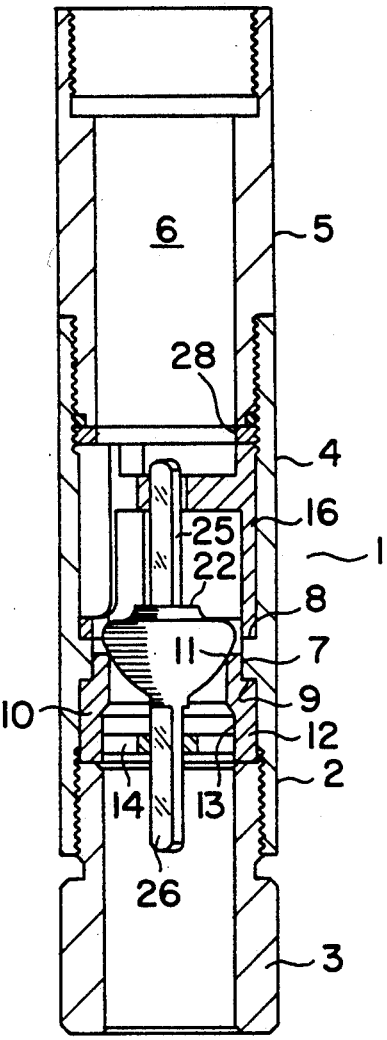
FIG. 1
"PRIOR ART"
FIG. 2

BALL AND SEAT-TYPE CHECK VALVE FOR DOWNHOLE ROD PUMP

CROSS-REFERENCE TO RELATED APPLICATION

This is a continuation-in-part of application Ser. No. 07/529,497, filed May 29, 1990 now U.S. Pat. No. 5,117,861.

FIELD OF THE INVENTION

The present invention relates to an improved check valve for use in a downhole rod pump of the type used in oilwells.

BACKGROUND OF THE INVENTION

A conventional downhole rod pump incorporates a pair of ball and seat-type check valves, commonly referred to as a standing valve and a travelling valve. A conventional design for this long known valve is shown in FIG. 1.

The conventional valve comprises a bottom nose sub, a barrel and a top sub. These tubular components are screwed together end to end to form the outer housing of the valve. The innards of the valve comprise an annular seat member, a cylindrical cage, and a ball or plunger. The seat member is inserted into the bore of the barrel from the bottom, to abut an inwardly projecting ring shoulder formed by the barrel wall. The seat member is locked in place and supported from below by the nose sub. The seat member provides an annular valve seat against which the ball seals to close off the flow passage extending through the valve. The nose sub, seat member and barrel combine to form an outer bottom seal below the ball and seat seal. The cage is inserted from the top end of the barrel bore, seats on the barrel ring shoulder and is locked in place by an annular seal ring and the top sub. The sidewall of the cage typically forms four windows separated by the vertically extending non-removed portions which are referred to as guide ribs. At its upper end the cage has a transverse stop bar. The ball fits loosely in the cage, so that it can easily leave the seat and move up or down within the cage. However, its fit relative to the cage is close enough so that the ribs effectively guide it and prevent it from rattling around excessively in the cage. The stop bar limits the upward movement of the ball.

Now, one aspect of the present invention has to do with increasing the flow capacity of the valve, keeping in mind that the inner diameter of the barrel bore limits the radial dimensions of the valve innards. Stated otherwise, one is precluded from enlarging the outer diameter of the valve innards when one attempts to increase the flow capacity of the valve.

At this point, it is appropriate to identify the constraining flow areas within the valve. FIG. 7 schematically shows them. The flow areas are cross-hatched. More particularly, the valve flow passage comprises, from the bottom up:
the bore of the seat member;
the space left unoccupied when the ball is positioned off the seat within the cage, said space being mainly provided by the windows; and
the space left between the stop bar and the upper ring of the cage.

The question arises: Why would one want to increase the flow capacity of the valve and thus that of the pump itself? The present invention arose in connection with the pumping of heavy oil (although the valve is not limited to that application). A significant problem in pumping viscous heavy oil is that the rod string can only slowly drop down through the column of oil present within the tubing string in which the rod string reciprocates. So one is limited to a certain number of strokes per minute. If the well is capable of producing more fluid than the pump can move, given the limitation on stroking rate, then production is being hampered. In the alternative, if stroking rate can be increased, operating costs will increase as the system is driven harder.

So it has long been appreciated that it would be desirable to improve the flow capacity of the valves used in a given size of downhole pump. However it has also been a condition that if this is to be done, the change in design cannot be accompanied by a significant loss in the useful operating life of the valve.

Turning now to the patent literature known to applicant, the following references are of interest:

| | |
|---|---|
| U.S. 1,353,409 - McEvoy | U.S. 170,974 - Westwater |
| U.S. 1,860,004 - Yardley | U.S. 1,960,970 - Fina |
| U.S. 2,233,649 - Stahl et al | U.S. 2,943,639 - Smith |
| U.S. 4,369,808 - Hagman | |

SUMMARY OF THE INVENTION

The invention is directed toward providing a check valve, for a downhole rod pump, having a barrel, annular seat member, cage and plunger, characterized by increased flow capacity (relative to the conventional valve) and desirable durability.

More particularly, in both essential and preferred details, the improved valve involves:

A plunger comprising a valve member having an arcuate sealing surface and being relatively small in diameter, so that it is inwardly spaced from the cage ribs, thereby increasing the available flow area around the valve member when it is displaced off the seat and up into the cage chamber;

Equipping the now smaller valve member with integral, axially extending, centrally positioned top and bottom stems that extend through aligned apertures in transverse webs carried by each of the seat member and cage. (The stems and valve member together make up the plunger.) The stems and webs cooperate to provide means for loosely guiding and centralizing the valve member in the course of its movement, so as to maintain a consistent path of travel and to ensure that the valve member consistently seats centrally and avoids rattling against the cage ribs (which leads to nicking of the valve member's seal surface);

Since the stems reciprocate in the web apertures, it is desirable to minimize sticking and ensure that solids do not pack solidly between the parts, so that ease of movement is lost. Therefore each stem has a loose fit in its corresponding web and the apertures in the webs are circular and the stem is straight-sided, to create clearance for fluid flow between the two parts, so that sand particles and the like may be flushed out. By having an arcuate sealing surface and a loosely working guide means, the valve member is adapted to "work" its way down into the seat to effect a circumferential, line contact seal;

The valve member of the plunger is semi-spherical in form and has a spacing neck at its upper end, to permit the upper guide web to be positioned part way down the cage (so that the top flow area is enlarged), while still enabling the valve member to move far enough off the seat to provide the desired clearance, and to leave some space between the valve member and the guide web when the valve is fully open;

The cage is formed with only 2 or 3 ribs, to thereby widen the windows; and

The valve member seal surface and seat are formed with complementary radius-on-radius or radius-on-bevel configurations, to ensure that a liquidtight, essentially linear circumferential contact seal is maintained, even though the stems and webs wear and the tolerance between them increases.

With these features incorporated in the check valve, the following advantages have been realized:

the flow area through the valve has been increased;

by guiding the valve member, it remains generally centered relative to the seat;

by guiding the valve member, it cannot rattle in the cage and be nicked; and by using loose-fitting guide means and line contact sealing surfaces, the effective life of the seal has been maintained.

More particularly, when the entire combination was tested, applicant achieved increases in minimum flow area, compared to the conventional design, in the order of the following:

| Cage outside diameter | Flow area increase |
| --- | --- |
| 1.170" | 22% |
| 1.390" | 48% |
| 1.615" | 20% |
| 1.720" | 32% |

A downhole rod pump was equipped with valves in accordance with the preferred form of the present invention. Previous to the modification, the pump produced 65 MCFD of gas and 57 barrels of water per day. After modification, the pump produced 370 MCFD and 122 barrels of water per day. In this case, in connection with the modification, the pump stroke was increased by 10" (which would account for about 20 barrels of water per day)—however the pumping speed was also reduced from 12 to 7 strokes/minute.

In another test, all pump and stroke factors were kept constant, except for the substitution of modified valves. Oil production increased from 172 barrels per day to 204 BPD.

Broadly stated, the invention is directed to an improvement in a check valve for assembly and use in a downhole rod pump, comprising: a tubular one-piece barrel having a longitudinal bore; a tubular nose sub adapted to thread into the lower end of the barrel and having a longitudinal bore; a hollow cylindrical cage adapted to be contained in the upper end of the barrel bore, said cage having upstanding, spaced apart ribs forming its side wall and defining flow windows therebetween, said cage forming an internal chamber having a bottom inlet and top outlet; a tubular seat member, forming a longitudinal bore, adapted to be retained in the lower end of the barrel bore by end support from the nose sub, said seat member forming an annular valve seat; means for retaining the cage in the barrel bore; a plunger having a valve member adapted to be disposed in the cage chamber, said valve member having upper and lower ends, said lower end forming an arcuate sealing surface adapted to seal against the valve seat with essentially line contact to effect a liquid-tight seal, the valve member being spaced inwardly from the ribs; the seat member and nose sub being adapted to form a unit for cooperating with the barrel to effect a liquid-tight lower outer seal for preventing downward leakage of liquid through the check valve when the valve member is seated; the length of the cage chamber being sufficient to allow the valve member to be displaced upwardly off the valve seat to open a flow passage extending through the assembled check valve; the plunger having centrally located upper and lower guide stems extending axially from the upper and lower ends of the valve member; the seat member and cage each having a transversely extending guide web forming a central aperture for receiving and loosely guiding the guide stems to centralize the valve member, each associated guide means and stem having a clearance therebetween for enabling sand particles to pass therebetween.

DESCRIPTION OF THE DRAWINGS

FIG. 1 is a simplified side sectional view showing a conventional ball and seat-type check valve;

FIG. 2 is a simplified side sectional view showing a check valve in accordance with one preferred mode of the invention;

DESCRIPTION OF THE PREFERRED EMBODIMENT

Figure 3:
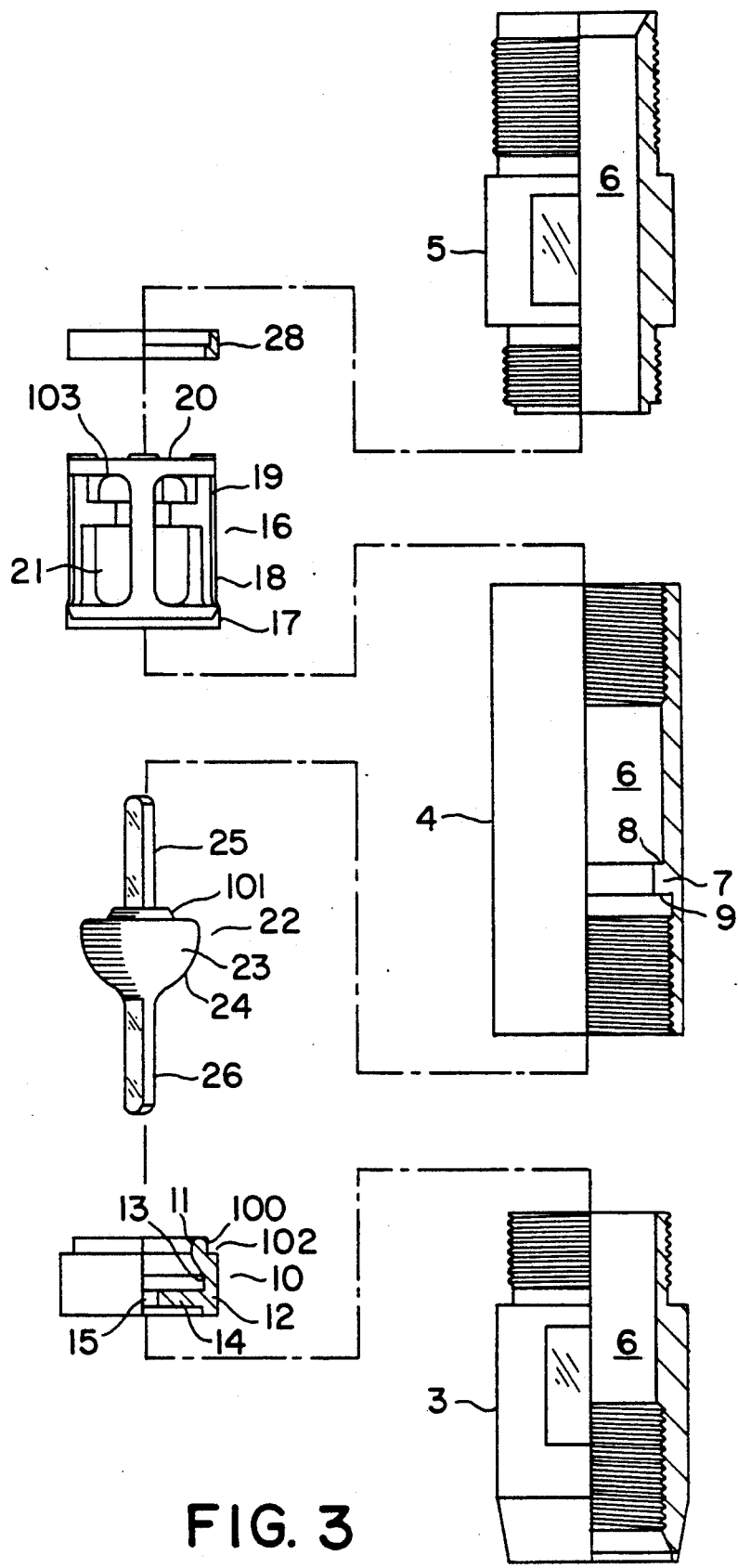
FIG. 3 is an exploded side view showing the components of the new check valve of FIG. 2, with broken lines indicating the manner of assembly.
Figure 4:
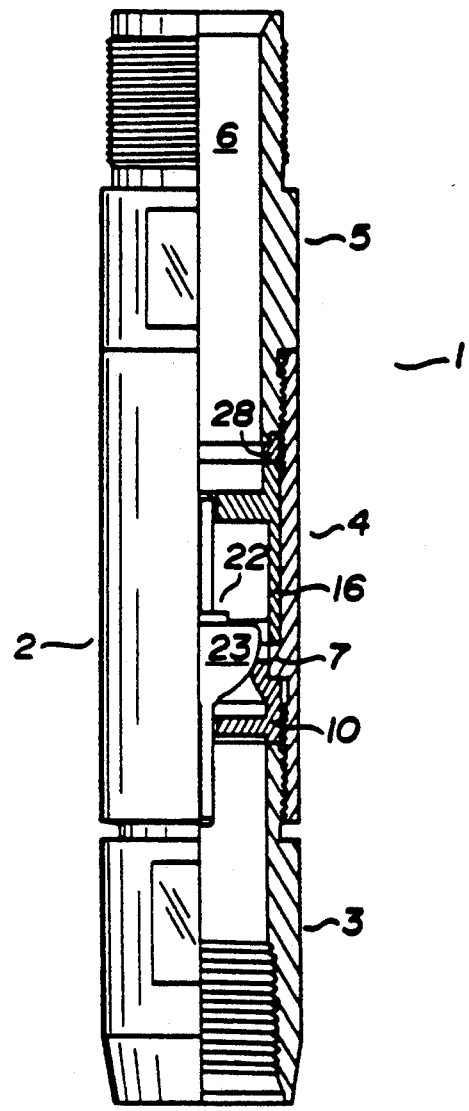
FIG. 4 is an assembled partly sectional side view of the check valve of FIG. 3.
Figure 5:
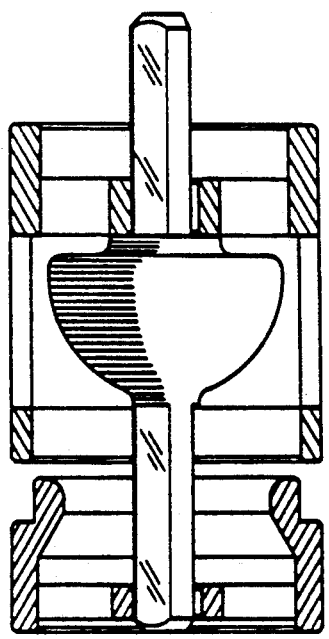
FIGS. 5 and 6 are sectional side views showing the assembly of seat member, plunger and cage in the seated and unseated modes.
Figure 6:
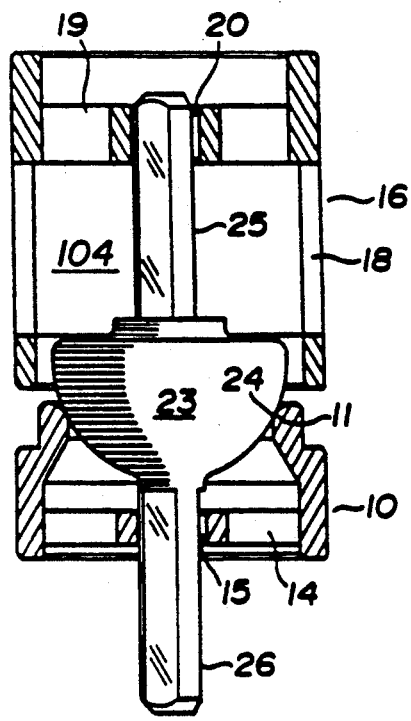
Figure 7A:
FIGS. 7a–7g provide a chart identifying the three main flow areas of a conventional valve and the four main flow areas of the present valve, with the flow areas cross-hatched.
Figure 7D:
Figure 7E:
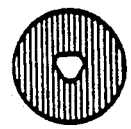
Figure 7B:
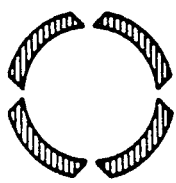
Figure 7F:
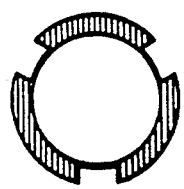
Figure 7C:
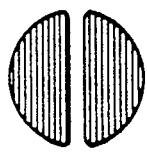
Figure 7G:
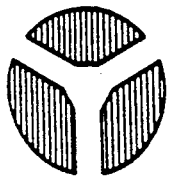
Figure 8:
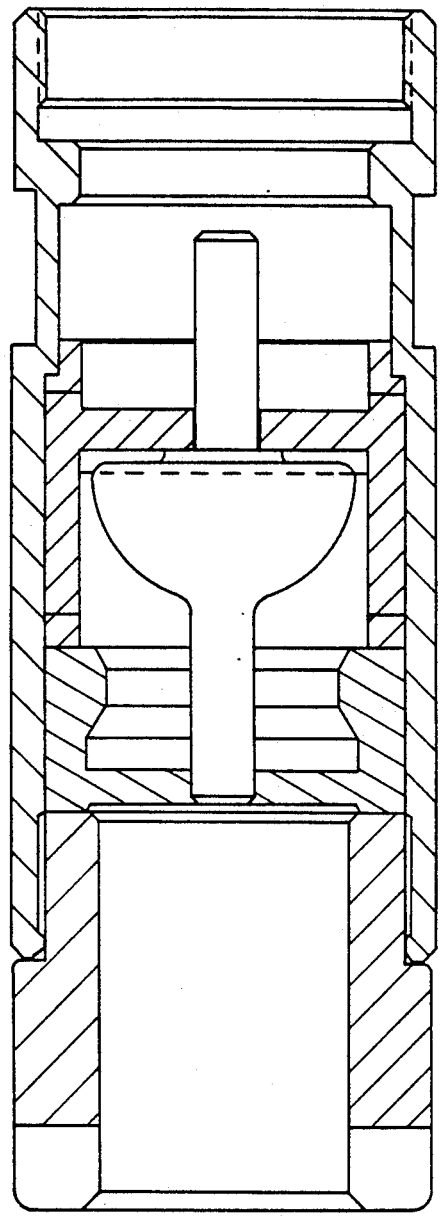
FIGS. 8 and 9 are sectional side views showing a modified form of the valve used in large diameter pumps, with the plunger shown in the unseated and seated positions.
Figure 9:
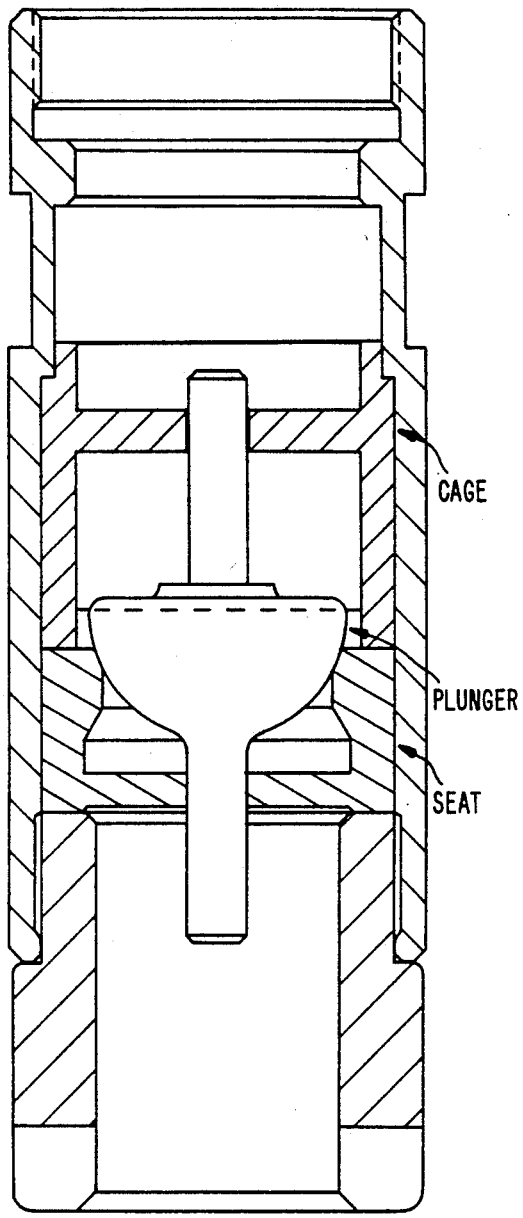
Figure 10:
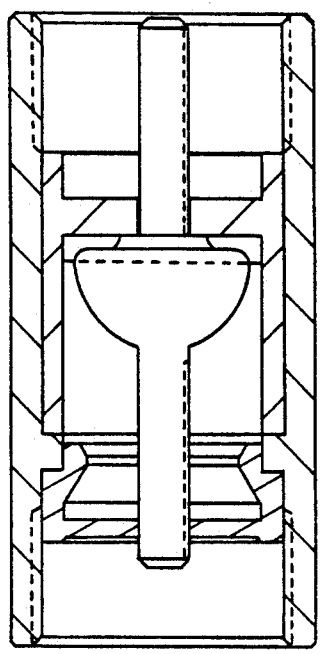
FIGS. 10 and 11 are sectional side views showing a valve assembly having a bevelled seat and radiused valve member, with the valve member fully unseated in FIG. 10 and providing line contact sealing in FIG. 11.
Figure 11:
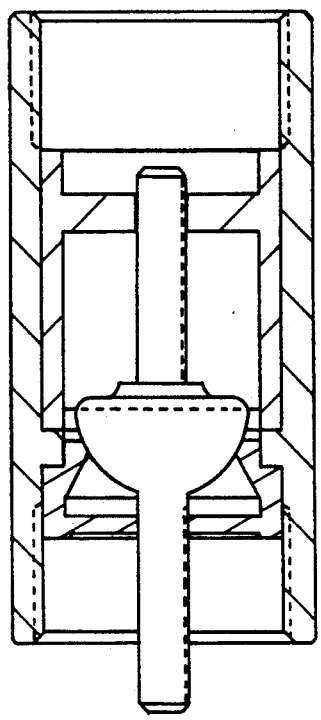

As shown in FIG. 3, the valve 1 comprises an outer housing 2 formed by a nose sub 3, barrel 4 and top sub 5. The housing 2 is generally tubular in form, having a bore 6. The nose sub 3, barrel 4 and top sub 5 screw thread together end to end.

Along its length, the barrel 4 forms an inwardly projecting, reduced diameter portion or ring 7 having top and bottom shoulders 8, 9.

Figure 12:
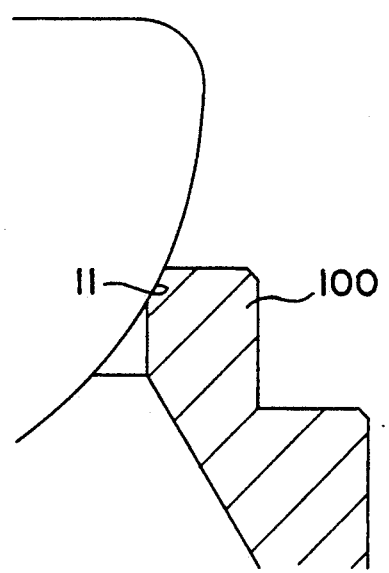
FIGS. 12 and 13 are expanded partial side sectional views showing radius to radius sealing and radius to bevel sealing respectively.
Figure 13:
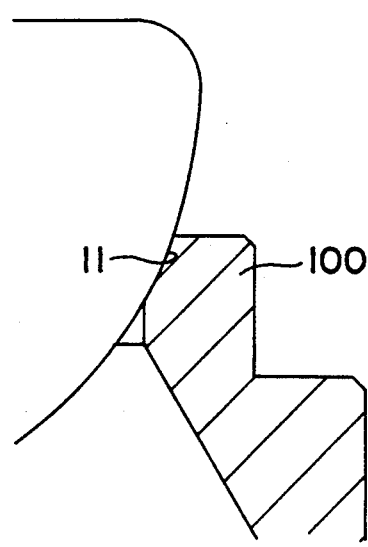
Figure 14:
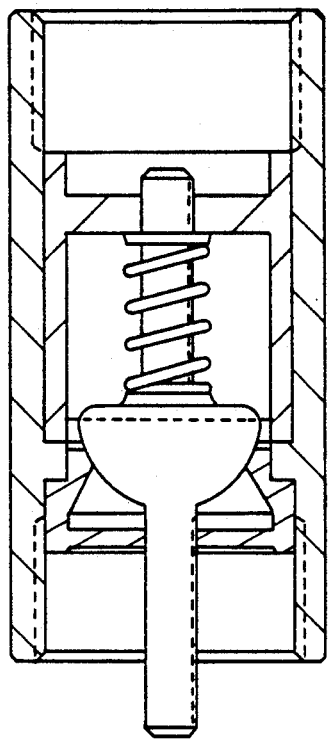
FIG. 14 is a side sectional view showing a valve in accordance with FIG. 2, the plunger having a light return spring.

A tubular seat member 10 is inserted into the barrel 4 from the bottom. The side wall of the seat member is inwardly recessed at its upper end to form a thinned side wall portion 100 and a radial shoulder 102. The radial shoulder 102 of the seat member 10 abuts the barrel's ring shoulder 9. The seat member 10 is locked in place by the nose sub 3. The thinned side wall portion 100 forms an annular seat 11 at its upper end, which may be radiused or bevelled as shown in FIGS. 12 and 13.

The lower portion 12 of the seat member 10 is relatively thick walled, and provides bore 13. A guide web 14 extends transversely across the bore 13 and is connected with the thick side wall of the portion 12. The guide web 14 forms a central aperture 15.

A cylindrical hollow open-ended cage 16 is inserted into the barrel 4 from the top in FIG. 2 and abuts the shoulder 8. The cage 16 has a connector or bottom ring 17, three upstanding, equally spaced apart ribs 18 and a ring connector 103 connected with the ribs 18 at their upper ends. A guide web 19 is downwardly spaced from the upper ring connector 103 and forms a central aperture 20. Windows 21 are formed between the ribs 18.

A plunger 22 is positioned to seat against the seat 11 and to reciprocate within the cage chamber 104. The plunger 22 comprises a generally semi-spherical valve member 23 having a rounded seal surface 24 adapted to form a line contact seal with the seat 11. Stated otherwise, the seal surface 24 and seat 11 have radius-to-radius or radius-to-bevel line contact, as shown in FIGS. 12 and 13 respectively. The valve member 23 is sufficiently small, so that it is inwardly spaced from the ribs 18. The valve member 23 has a central spacer 101, for spacing it downwardly from the upper guide web 19, when the valve is fully open. The valve member 23 further has axially extending, centrally located, upper and lower stems 25, 26. As shown, the stems 25, 26 are straight-sided. Thus clearances 15 are formed between the stems 25, 26 and the web apertures 15, 20. The stems 25, 26 have a loose fit in the web apertures 15, 20.

A conventional annular damper or seal ring 28 is provided to seal between the top sub 5 and the barrel 4.

From the foregoing, it will be noted that:

The plunger valve member 23 is inwardly spaced from the ribs 18, to open up the flow passage between the valve member 23 and the housing 2;

The small valve member 23 is guided and centralized by the stems 25, 26 and webs 14, 19;

The spacer 101 spaces the valve member 23 down from the upper guide web 19, to open up the upper flow area;

The valve member 23 is preferably semi-spherical, to further open up the flow passage at its upper end; and The space taken up by the cage ribs 18 is reduced by using only two or three ribs, thereby widening the windows 21.

This combination of features increases the flow capacity of the valve 1 relative to the conventional commercial valve shown in FIG. 1

It further will be noted that the present valve uses stems and webs to provide the centralizing or guiding function. These parts would have a tendency to seize up if solids pack between them. However, the loose fit and the provision of the clearance 27 for flushing have solved this problem in the context of the combination. It also is desirable that the plunger be guided only loosely so that the valve member 23 can work its way into the valve seat 11.

It needs to be understood that the clearance can be provided simply by having a sufficient difference in diameter of the guide stem and web aperture, to permit sand particles to work their way through therebetween. We prefer to provide a loose fit between the contacting portion of stem and web and to provide the flat-and-circular opening for sand clearance. Both approaches are considered to be within the scope of the invention.

The preferred use of radius-on-radius and radius-on-bevel seal surfaces, coupled with centralizing, has increased the seal life of the ball and seat, relative to the conventional assembly of FIG. 1.

It will further be noted that the barrel is of solid one-piece construction and contains and supports the seat member 10 and cage 16 along their outer surfaces. In addition, the seat member 10, in contact with the bottom shoulder 9 of the barrel ring 7 and the top end surface of the nose sub 3, provides an outer bottom seal to prevent the escape of fluid around the valve member seal.

The scope of the invention is defined by the claims now following.

The embodiments of the invention in which an exclusive property or privilege is claimed are defined as follows:

1. A check valve for assembly and use in a downhole rod pump, comprising:

a tubular one-piece barrel having a longitudinal bore;

a tubular nose sub adapted to thread into the lower end of the barrel and having a longitudinal bore;

a hollow cylindrical cage adapted to be contained in the upper end of the barrel bore, said cage having upstanding, spaced apart ribs forming its side wall and defining flow windows therebetween, said cage forming an internal chamber having a bottom inlet and top outlet;

a tubular seat member, forming a longitudinal bore, adapted to be retained in the lower end of the barrel bore by end support from the nose sub, said seat member forming an annular valve seat;

means for retaining the cage in the barrel bore;

a plunger having a valve member adapted to be disposed in the cage chamber, said valve member having upper and lower ends, said lower end forming an arcuate sealing surface adapted to seal against the valve seat with essentially line contact to effect a liquid-tight seal, the valve member being spaced inwardly from the ribs;

the seat member and nose sub being adapted to form a unit for cooperating with the barrel to effect a liquid-tight lower outer seal for preventing downward leakage of liquid through the check valve when the valve member is seated;

the length of the cage chamber being sufficient to allow the valve member to be displaced upwardly off the valve seat to open a flow passage extending through the assembled check valve;

the plunger having centrally located upper and lower guide stems extending axially from the upper and lower ends of the valve member;

the seat member and cage each having a transversely extending guide web forming a central aperture for receiving and loosely guiding the guide stems to centralize the valve member, each associated guide means and stem having a clearance therebetween for enabling sand particles to pass therethrough.

2. The check valve according to claim 1 wherein:

the upper guide web of the cage is spaced downwardly from the top ends of the ribs to open up the top outlet of the cage; and the number of ribs is two or three.

3. The check valve according to claim 2 wherein:

the valve member is generally semi-spherical; and the cage guide web comprises legs extending inwardly from each of the ribs and connector means connecting the ends of the legs and forming the central aperture.

4. The check valve according to claim 3 wherein:
the valve member has spacer means at its upper end for spacing it downwardly from the upper guide web when the valve is fully open.

5. The check valve according to claim 4 wherein:
one of each guide stem and associated web aperture is partially straight-sided and the other is circular.

6. The check valve as set forth in claim 4 wherein:
the cage retaining means is a tubular member adapted to threadably connect with the upper end of the barrel.

7. The check valve as set forth in claim 2 comprising:
a seal ring for retention between the cage retaining means and the cage for preventing leakage through the threaded connection of said means with the barrel.

8. The check valve as set forth in claim 3 comprising:
a seal ring for retention between the cage retaining means and the cage for preventing leakage through the threaded connection of said means with the barrel.

9. The check valve as set forth in claim 4 comprising:
a seal ring for retention between the cage retaining means and the cage for preventing leakage through the threaded connection of said means with the barrel.

10. The check valve as set forth in claim 5 comprising:
a seal ring for retention between the cage retaining means and the cage for preventing leakage through the threaded connection of said means with the barrel.

11. The check valve as set forth in claim 2 comprising:
the cage having top and bottom ring connectors connecting the ribs; and
tubular first means, adapted to connect with the upper end of the barrel, for retaining the cage in the barrel.

12. The check valve as set forth in claim 3 comprising:
the cage having top and bottom ring connectors connecting the ribs; and
tubular first means, adapted to connect with the upper end of the barrel, for retaining the cage in the barrel.

13. The check valve as set forth in claim 4 comprising:
the cage having top and bottom ring connectors connecting the ribs; and
tubular first means, adapted to connect with the upper end of the barrel, for retaining the cage in the barrel.

14. The check valve as set forth in claim 7 comprising:
the cage having top and bottom ring connectors connecting the ribs; and
tubular first means, adapted to connect with the upper end of the barrel, for retaining the cage in the barrel.

15. The check valve as set forth in claim 8 comprising:
the cage having top and bottom ring connectors connecting the ribs; and
tubular first means, adapted to connect with the upper end of the barrel, for retaining the cage in the barrel.

16. The check valve as set forth in claim 9 comprising:
the cage having top and bottom ring connectors connecting the ribs; and
tubular first means, adapted to connect with the upper end of the barrel, for retaining the cage in the barrel.

17. The check valve as set forth in claim 10 comprising:
the cage having top and bottom ring connectors connecting the ribs; and
tubular first means, adapted to connect with the upper end of the barrel, for retaining the cage in the barrel.

18. A check valve replacement assembly for use in a check valve of the type used in a downhole rod pump, comprising:
a hollow open-ended cylindrical cage forming an internal chamber and comprising transverse upper and lower ring connectors at each end joined by substantially equally spaced apart, upstanding ribs forming the cage side wall and defining flow windows therebetween said cage having a transversely extending web forming a central aperture, said web projecting across the cage chamber, said web being spaced downwardly from the upper ring connector, said web being formed by inwardly projecting legs joined at their inner ends by aperture-forming means, whereby an upper outlet from the cage is formed between the web and upper ring connector;
a tubular seat member forming a longitudinal bore and having its side wall recessed at its upper end to form a thinned side wall end portion, said portion forming an annular valve seat, said seat member having a transversely extending web forming a central aperture, said web projecting across its bore adjacent its lower end;
a plunger having a valve member adapted to be disposed in the cage chamber, said valve member having upper and lower ends, said lower end forming an arcuate sealing surface adapted to seal against the valve seat with essentially line contact to effect a liquid-tight seal, the valve member being inwardly spaced from the ribs when operating in the cage;
the plunger having centrally located upper and lower guide stems extending axially from the upper and lower ends of the valve member;
said cage and seat member web apertures being adapted to slidably receive the upper and lower guide stems respectively, when assembled, each associated web and stem having a clearance therebetween.

19. The assembly according to claim 18 wherein:
the valve member is generally semi-spherical.

20. The assembly according to claim 19 wherein:
the valve member has spacer means at its upper end for spacing it downwardly from the upper guide web when the assembly is fully open.

21. The assembly according to claim 19 wherein:
the number of ribs is two or three.

22. The assembly according to claim 20 wherein:
the number of ribs is two or three.

23. A check valve for use in a downhole rod pump, comprising:

an upper tubular one-piece barrel having a longitudinal bore and forming an inwardly projecting reduced diameter ring between its ends;

a tubular seat member forming a longitudinal bore and having its side wall recessed at its upper end to form a radial shoulder and a thinned side wall end portion, said shoulder abutting the lower shoulder of the barrel inner ring, said end portion forming an annular valve seat, said seat member having a transversely extending web, forming a central aperture, projecting across its bore adjacent its lower end;

a tubular nose sub threaded into the lower end of the barrel for retaining the seat member in the barrel against the barrel inner ring;

a hollow open-ended cylindrical cage forming an internal chamber and seated on the upper shoulder of the barrel inner ring, said cage comprising transversely extending upper and lower ring connectors at each end joined by substantially equally spaced apart, upstanding ribs forming the cage side wall and defining flow windows therebetween, said cage having a transversely extending web, forming a central aperture, projecting across the cage chamber, said web being spaced downwardly from the upper ring connector, said web being formed by inwardly projecting legs joined at their inner ends by aperture-forming means, whereby the lower connector forms a lower cage inlet and an upper cage outlet is formed between the cage web and upper ring connector;

a tubular top sub threaded into the upper end of the barrel for retaining the cage in the barrel against the barrel inner ring;

a plunger having a valve member disposed in the cage chamber, said valve member having upper and lower ends, said lower end forming an arcuate seating surface adapted to seal against the valve seat with essentially line contact to effect a liquid-tight seal, the valve member being inwardly spaced from the ribs;

the plunger having centrally located upper and lower guide stems extending axially from the upper and lower ends of the valve member and being slidably received in the web aperture of the cage and valve member;

each stem and associated web aperture having a loose fit and a clearance therebetween;

the entire outer side surfaces of the cage and seat member being in contiguous supporting contact with the barrel;

the length of the cage chamber being sufficient to allow the valve member to be displaced upwardly off the valve seat to open a flow passage extending through the check valve;

the seat member and nose sub forming a unit for cooperating with the barrel to effect a liquid-tight lower outer seal for preventing downward leakage of liquid through the check valve when the valve member is seated.

24. The check valve according to claim 23 wherein:
the number of cage ribs is two or three;
the valve member is generally semi-spherical; and
a seal ring is positioned between the top sub and cage to seal the thread connection between barrel and top sub.

25. The check valve according to claim 24 wherein:
one of each guide stem and associated web aperture is partially straight-sided and the other is circular.

26. The check valve according to claim 24 wherein:
the valve member has spacer means at its upper end for spacing it downwardly from the upper guide web when the valve is fully open.

* * * * *